(12) United States Patent
Hermann

(10) Patent No.: US 9,053,755 B2
(45) Date of Patent: Jun. 9, 2015

(54) METHOD AND APPARATUS FOR ACTIVE NOISE SHEDDING

(75) Inventor: Thomas Joseph Hermann, Troy, MI (US)

(73) Assignee: Ford Global Technologies, Dearborn, MI (US)

( * ) Notice: Subject to any disclaimer, the term of this patent is extended or adjusted under 35 U.S.C. 154(b) by 1262 days.

(21) Appl. No.: 12/557,657

(22) Filed: Sep. 11, 2009

(65) Prior Publication Data

US 2011/0064237 A1 Mar. 17, 2011

(51) Int. Cl.
- G10K 11/16 (2006.01)
- H04B 1/10 (2006.01)
- H05K 11/02 (2006.01)
- G11B 33/14 (2006.01)
- G11B 31/00 (2006.01)

(52) U.S. Cl.
CPC ............ *G11B 33/1493* (2013.01); *G11B 31/00* (2013.01)

(58) Field of Classification Search
CPC ............................................. G10K 2210/1282
USPC ............ 363/131, 21.12, 21.15, 21.18, 39, 41, 363/71, 97; 123/143 C, 169 PH, 633, 606; 381/3, 4, 14, 86, 15, 16, 58, 71.2, 71.4, 381/94.1, 94.2, 94.6; 455/296, 297, 345, 455/298
See application file for complete search history.

(56) References Cited

U.S. PATENT DOCUMENTS

| 7,827,975 | B1* | 11/2010 | Gibson et al. | 123/636 |
| 2006/0009897 | A1* | 1/2006 | Schick et al. | 701/50 |
| 2006/0226710 | A1* | 10/2006 | Kawasaki et al. | 307/113 |
| 2009/0126710 | A1* | 5/2009 | Alger et al. | 123/636 |
| 2009/0168800 | A1* | 7/2009 | Leinonen et al. | 370/464 |

OTHER PUBLICATIONS

John Rice, Dirk Gehrke, and Mike Segal, Understanding Noise-Spreading Techniques and their Effects in Switch-Mode Power Applications, Texax Instruments 2008 Power Seminars, Introduction.*
Rice, Understanding Noise-Spreading Techniques and their effects in Switch-Mode Power Application, Introduction p. 1.*

* cited by examiner

*Primary Examiner* — Vivian Chin
*Assistant Examiner* — William A Jerez Lora
(74) *Attorney, Agent, or Firm* — Frank A. MacKenzie; Brooks Kushman P.C.

(57) ABSTRACT

A method for reducing audible noise in a vehicle audio component includes steps of: determining that the audio component is or is about to be operating in a susceptible mode wherein it is likely to receive electrical interference caused by an electrical component operating in an interfering operating state; communicating to the electrical component that the audio component is operating in the susceptible mode; and changing operation of the electrical component from the interfering operating state to a non-interfering operating state less likely to generate electrical signals causing audible noise.

18 Claims, 1 Drawing Sheet

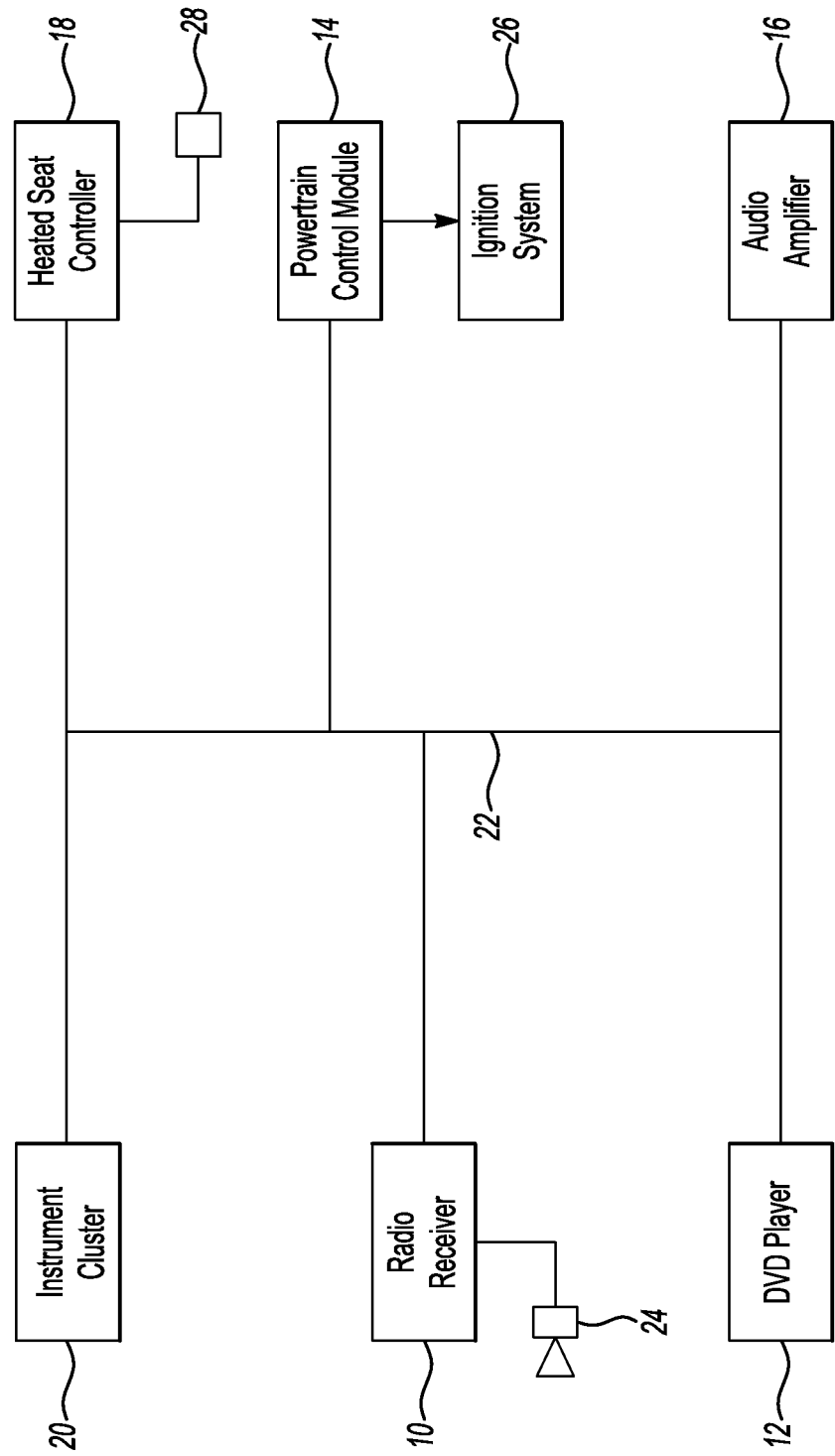

METHOD AND APPARATUS FOR ACTIVE NOISE SHEDDING

BACKGROUND

1. Technical Field

The present invention relates to automotive vehicle audio systems and more specifically to a method and apparatus for reducing electrical interference caused by the operation of other on-board electrical components.

2. Background Art

Modern automotive vehicles have many separate electronic control units (ECUs) for various vehicle systems, subsystems, and components. These ECUs may typically include those for the engine, transmission, occupant restraint systems, collision sensors, antilock brakes, cruise control, audio/entertainment systems, power windows, etc. It is well known to utilize an electronic communications network, or bus, to interconnect and allow communication between the ECUs without the need for a host computer. Examples of communications networks currently used in automotive applications are Controller Area Network (CAN) and Local Interconnect Network (LIN). Such bus systems have been found to enable a maximum sharing of information between systems with a minimum of hardware complexity and expense.

One undesirable consequence of the increase of electrical and electronic systems in automobiles is the possibility of electromagnetic interference (EMI). The conventional solution to EMI problems have included, repackaging of components, shielding, and circuit changes. These solutions typically involve adding considerable cost and/or development time to the product.

More recently, it has become known to integrate entertainment systems, such as radios, CD players, and DVD players, into the communications bus.

SUMMARY

The invention provides a system and method for reducing undesired audible noise in a vehicle audio component that may otherwise be caused by the operation of other vehicle electrical systems.

According to an embodiment of the invention, a method comprises the step of determining that an audio component is or is about to be operating at a susceptible mode wherein it is susceptible to electrical interference caused by operation of an electrical component in an interfering operating state. In a further step, the fact that the audio component is operating at the susceptible mode is communicated to the electrical component. And in a further step, the electrical component is changed from the interfering operating state to a non-interfering operating state wherein it is less likely to generate electrical signals causing audible noise in the audio system.

According to a further embodiment of the invention, a method comprises the step of identifying a likelihood of a conflict between an audio component operating in a susceptible mode wherein the audio component is susceptive to audible noise created by operation of an electrical component in an interfering operating state; communicating to the electrical component that the audio component is or is about to be operating in the susceptible mode; and when the audio component is in the susceptible mode, switching the electrical component from the interfering operating state to a non-interfering operating state wherein it is less likely to produce electrical signals creating audible noise in the audio component.

According to a further embodiment of the invention, an electrical system for an automotive vehicle comprises an electronic communication bus; an audio component sending a mode message by means of the electronic communication bus indicating that the audio component is in or is about to enter a susceptible mode wherein it is susceptible to electrical interference likely to cause audible noise in the audio component; and an electrical component operable in an interfering operating state wherein it is likely to create electrical interference causing audible noise in the audio system when the audio system is in the susceptible mode. The electrical system is further operable in a non-interfering operating state wherein it is less likely to create electrical interference causing audible noise in the audio system, and the electrical component receives the mode message by means of the electronic communication bus and switches from the interfering operating state to the non-interfering operating state in response to receiving the mode message.

BRIEF DESCRIPTION OF THE DRAWINGS

Embodiments of the present invention will now be described by way of example only with reference to the accompanying drawings in which:

FIG. 1 is a schematic system diagram of a vehicle electrical system according to an embodiment of the invention.

DETAILED DESCRIPTION

Referring to FIG. 1, an example of a vehicle electrical system is shown to include electrical components such as a radio receiver 10, a DVD player 12, a powertrain control module (PCM) 14, an audio amplifier 16, a heated seat controller 18, and an instrument cluster 20.

The above named components, as well as many other vehicle components and/or system, are interconnected by a Controller Area Network (CAN) bus 22, which allows the components/systems to communicate with one another in a manner that is well known in the automotive electronics arts. Any suitable wired or wireless communications network may be used, non-limiting examples of which include Local Interconnect Network (LIN), 1394, Firewire, Ethernet, Bluetooth, and 802.11.

The radio receiver 10 is capable of receiving signals in various frequency ranges, including the FM and AM bands. When tuned to certain frequencies, radio receiver 10 may be susceptible to electrical interference generated by other electrical components in the vehicle. For example, when radio receiver 10 is tuned to receive a radio frequency that is a multiple of the operating frequency of the switching power supply of audio amplifier 16, the radio receiver may receive RF interference that is exhibited as audible noise produced by the audio system speakers 24. For example, if the power supply of audio amplifier 16 is operating at a switching frequency of 100 KHz (kilohertz) audible interference may be generated when radio receiver 10 is tuned to 500 KHz, 600 KHz, 700 KHz, and so forth through the AM radio band.

In this case, the interference problem may be reduced or eliminated by identifying a situation in which there is a likelihood of a conflict between the frequency to which radio receiver 10 is tuned and the switching frequency of the audio amplifier 16, and directing the audio amplifier to change to a different, non-interfering switching frequency. For example, if radio receiver 10 is tuned to a frequency that is an even multiple of 100, audio amplifier 16 may be tuned to 110 KHz, which is a non-interfering operating state because the harmonics or multiples of that frequency do not coincide with the frequency to which the radio receiver 10 is tuned.

To achieve automatic switching to a non-interfering operating state, radio receiver 10 generates a mode message indicating that it is (or is about to be) tuned to a particular frequency and this mode message is transmitted over CAN bus 22 so that it may be received by audio amplifier 16. In response to receiving the mode message, audio amplifier 16 changes its switching frequency to avoid the tuned frequency of radio receiver 10. In the case of an audio amplifier 16 that is controlled by a micro-processor, the change of switching frequency is pre-programmed into the software. The change may be accomplished by changing the timer setting of a counter that controls the PWM of the control signal.

It is possible for the radio receiver 10 to continuously communicate (via CAN bus 22) the mode message so that any other electrical component on the CAN bus 22 receives constant updates on the mode of the radio receiver. Alternatively, radio receiver 10 may generate and send the mode message only when it is tuned to a frequency that is a susceptible mode in relation to the known or possible interfering operating states of other electrical components on CAN bus 22, such as the audio amplifier 16. In either case, audio amplifier 16 will receive the mode message, read the tuned frequency information included in the mode message, compare the tuned frequency with the current power supply switching frequency, and make pre-programmed operating state changes as necessary to change to a non-interfering state.

Instrument cluster 20 may include PWM-controlled lighting and/or may have stepper motors, either of which have the potential to cause interference in an audio component if operating at frequencies that conflict with susceptible operating modes of the audio component. These devices may also receive mode messages from audio components having susceptible operating states and make operating state changes as necessary to avoid noise-producing conflicts.

It has also been found that a radio receiver 10 may be susceptible to audible interference created by a vehicle ignition system 26, particularly when the radio receiver 10 is receiving a weak radio signal and the ignition system is operating is a multi-strike mode. In a multi-strike mode, the ignition system provides two electrical pulses to each spark plug for each ignition cycle in order to improve combustion. The multiple spark mode is typically used when the engine is operating at low RPM (revolutions per minute) settings, such as below 1500 RPM.

In this situation, radio receiver 10 may generate a mode message identifying the radio frequency to which it is tuned and/or indicating that the strength of the received signal is low. The mode message is sent over the CAN bus 22 and received by PCM 14. PCM 14 controls the ignition system 26 and many other components (not shown) related to functioning of the vehicle's engine, transmission, and emissions control systems, as is well known in the automotive arts. In response to the mode message, PCM 14 may disable the multi-strike operation and operate ignition system 26 in a non-interfering, single-strike mode. The single-strike mode may be continued for as long as the radio receiver 10 is operating at a susceptible frequency and/or the signal strength is below a threshold value, at the end of which time the multi-strike mode may be resumed.

A DVD player 12 may also be susceptible to audible interference caused by another electrical component operating in an interfering operating state. For example, a heated seat controller 18 may use a PWM signal to control the supply of electrical power to a passenger seat heater 28. DVD player 12, especially when mounted in a seat headrest in close proximity to the seat heater, may be susceptible to audible interference caused by the PWM signal. To avoid this conflict, the DVD player 12 may generate a mode message containing information about its current status and transmit that status information via the CAN bus 22. The exact contents of the mode message will depend upon the pre-identified nature of the potential conflict between operating modes/states of the DVD player 12 and heated seat controller 18 and/or any other potentially interfering electrical component.

Upon receipt of the mode message indicating that DVD player 12 is in a susceptible state, heated seat controller 18 makes an appropriate adjustment so as not to be in a potentially interfering state. For example, heated seat module 18 may adjust its PWM switching frequency so that harmonics of that frequency are not within the audio pass band of the DVD player 12. Such a change of switching frequency puts heated seat controller 18 in a non-interfering state.

To apply the present methodology in the design of an electrical system, it is first necessary to identify the likelihood of a conflict between an audio component operating in a susceptible mode and another electrical component having an interfering operating state. The existence of susceptible frequencies and related interfering operating states may be determined by engineering analysis, simulations, empirical evidence, or by any other method that gives reliable results. It is possible for such interference problems to be broad-band in nature (covering many channels or frequencies) or narrow-band (occurring only at a single or small range or channels/frequencies). Once the susceptible frequencies and related interfering operating states are identified, the electrical system is designed such that as many of the possible conflicts as possible may be avoided by changing the operating states to avoid the conflicts.

After potential conflicts are identified, the involved audio components and other electrical components are programmed to avoid the conflicts. Audio components are programmed to communicate (via mode messages sent over the CAN bus) their status when it may indicate operation in a susceptible mode. This communication should contain sufficient information for the [conflicted?] other electrical components to make a proper reaction. For example, if the audio component is susceptible to interference because it is tuned to a particular frequency, the mode message should identify that frequency.

The electrical components that have been identified as having interfering operating states are programmed to receive the communications from the audio components and identify whether a conflict exists between the susceptible mode of the audio component and the operating state of the electrical component. If such a conflict exists, the electrical component is programmed to change to a non-interfering operating state for so long as it is necessary to avoid the conflict.

While the best mode for carrying out the invention has been described in detail, those familiar with the art to which this invention relates will recognize various alternative designs and embodiments for practicing the invention as defined by the following claims.

What is claimed is:

1. A method of reducing noise in a vehicle audio system comprising:
   determining that a vehicle audio system radio receiver is operating in a susceptible mode wherein it is susceptible to electrical interference caused by a vehicle electrical component having no wireless communications capability operating in an interfering state, the vehicle electrical component and the radio receiver both connected to an electronic communication bus of a motor vehicle;

sending a mode message to the vehicle electrical component via the communication bus that the radio receiver is in the susceptible mode; and changing operation of the vehicle electrical component to a non-interfering state less likely to cause electrical interference.

2. The method according to claim 1 wherein the mode message comprises information indicating a receiver frequency to which the radio receiver is tuned.

3. The method according to claim 1 wherein the mode message comprises information indicating a signal strength of a radio signal being received by the radio receiver.

4. The method according to claim 1 wherein the vehicle electrical component comprises an ignition system having a multi-strike capability, the interfering operating state comprises a multi-strike ignition mode and the non-interfering state comprises a single-strike ignition mode.

5. The method according to claim 1 wherein the vehicle electrical component comprises a switching power supply, the interfering operating state comprises a first switching frequency and the non-interfering state comprises a second switching frequency.

6. A method for reducing audible noise in an audio component of an automotive vehicle audio system, the method comprising:

identifying a likelihood of a conflict between the audio component operating in a susceptible mode and a vehicle electrical component having no wireless communications capability operating in an interfering state, the audio component and vehicle electrical component both connected to an electronic communication bus of the vehicle;

sending a mode message to the vehicle electrical component via the communication bus that the audio component is or is about to be in the susceptible mode; and when the audio component is in the susceptible mode, switching the vehicle electrical component from the interfering state to a non-interfering state wherein the non-audio electrical component is less likely to produce electrical signals creating audible noise in the audio component.

7. The method according to claim 6 wherein the audio component comprises a radio receiver and the mode message comprises information indicating a receiver frequency to which the radio receiver is tuned.

8. The method according to claim 6 wherein the audio component comprises a radio receiver and the mode message comprises information indicating a signal strength of a radio signal being received by the radio receiver.

9. The method according to claim 6 wherein the vehicle electrical component comprises an ignition system having a multi-strike capability, the interfering state comprises a multi-strike ignition mode and the non-interfering state comprises a single-strike ignition mode.

10. The method according to claim 6 wherein the vehicle electrical component comprises a switching power supply, the interfering frequency is a first switching frequency and the non-interfering frequency is a second switching frequency.

11. An electrical system for an automotive vehicle comprising:

a vehicle electronic communication bus;

an in-car audio component sending a mode message by means of the electronic communication bus indicating that the audio component is in or is about to enter a susceptible mode wherein it is susceptible to electrical interference likely to cause audible noise in the audio component; and a vehicle electrical component having no wireless communications capability operable in an interfering state wherein it is likely to create electrical interference causing audible noise in a vehicle audio system when the audio system is in the susceptible mode, and further operable in a non-interfering state wherein it is less likely to create electrical interference causing audible noise in the audio system when the audio component is in the susceptible mode, the non-audio electrical component receiving the mode message by means of the electronic communication bus and switching from the interfering state to the non-interfering state in response to receiving the mode message.

12. The apparatus according to claim 11 wherein the audio component comprises a radio receiver.

13. The apparatus according to claim 12 wherein the mode message comprises at least one of a receiver frequency to which the radio receiver is tuned and a signal strength of a radio signal received by the radio receiver.

14. The apparatus according to claim 11 wherein the vehicle electrical component comprises an ignition system having a multi-strike capability, the interfering state comprises a multi-strike ignition mode and the non-interfering state comprises a single-strike ignition mode.

15. The apparatus according to claim 11 wherein the vehicle electrical component comprises a switching power supply, the interfering state comprises a first switching frequency and the non-interfering state comprises a second switching frequency.

16. The apparatus according to claim 15 wherein the switching power supply powers at least one of a component of an instrument cluster and a seat heater.

17. The method according to claim 5 wherein the switching power supply powers at least one of a component of an instrument cluster and a seat heater.

18. The method according to claim 10 wherein the switching power supply powers at least one of a component of an instrument cluster and a seat heater.

* * * * *